US006910493B2

(12) United States Patent
Foster et al.

(10) Patent No.: US 6,910,493 B2
(45) Date of Patent: Jun. 28, 2005

(54) CONTROL APPARATUS, METHOD AND DIAGNOSTIC FOR HYDRAULIC FILL AND DRAIN

(75) Inventors: Michael D. Foster, Carmel, IN (US); Todd M Steinmetz, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/686,177

(22) Filed: Oct. 14, 2003

(65) Prior Publication Data

US 2005/0076958 A1 Apr. 14, 2005

(51) Int. Cl.$^7$ .............................................. F15B 13/06
(52) U.S. Cl. ...................... 137/12; 91/448; 137/596.16
(58) Field of Search .................... 91/424, 448; 137/12, 137/596.16

(56) References Cited

U.S. PATENT DOCUMENTS

| 2,878,832 | A | * | 3/1959 | Hoge | ..................... | 137/596.16 |
| 2,909,193 | A | * | 10/1959 | Hoge | ..................... | 137/596.16 |
| 2,970,611 | A | * | 2/1961 | Hoge | ..................... | 137/596.16 |
| 3,018,794 | A | * | 1/1962 | Hoge | ..................... | 137/596.16 |
| 3,135,289 | A | * | 6/1964 | Jordan | ..................... | 137/596.16 |
| 3,139,109 | A | * | 6/1964 | Ruchser | ................. | 137/596.16 |
| 3,283,862 | A | * | 11/1966 | Warnock | ............... | 137/596.16 |
| 4,966,195 | A | * | 10/1990 | McCabe | ................. | 137/625.61 |
| 5,931,757 | A | | 8/1999 | Schmidt | | |

* cited by examiner

*Primary Examiner*—Gerald A. Michalsky
(74) *Attorney, Agent, or Firm*—Leslie C. Hodges

(57) ABSTRACT

Hydraulic fill and drain of a clutch chamber is controlled with a blocking valve and a trim valve. The blocking valve selectively provides pressurized fluid to the trim valve which in turn selectively provides the pressurized fluid to the clutch chamber. Exhausting of the clutch chamber is effected through one of two alternate paths utilizing deactivation of one of the trim and blocking valves. Back up exhausting of the clutch chamber is effected through the other of the alternative paths. Such system allows for determination of valve failures and continued operation until such failures can be rectified.

12 Claims, 7 Drawing Sheets

CONTROL APPARATUS, METHOD AND DIAGNOSTIC FOR HYDRAULIC FILL AND DRAIN

TECHNICAL FIELD

The present invention is related to control of a dual-mode hybrid transmission. More particularly, the invention is concerned with the application and release of torque transmitting devices.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and two-mode operation.

In multi-mode EVTs, as in conventional multi-ratio transmissions, torque transmitting devices may be employed in order to effectuate selection among various gear set speed ratios and direction control elements. Application and release of torque transmitting devices (commonly referred to as clutches), such as for transfer of torque between speed ranges in multi-range gearset arrangements, is known to be accomplished via the supply and exhaust, respectively, of high pressure hydraulic fluid to apply chambers of the torque transmitting devices. The apply chamber pressure acts on a piston which in turn causes the engagement of, for example, interdigitated friction plates or a band about a drum. Clutches may be stationary or rotating devices. Clutch application is conventionally controlled by way of a solenoid controlled hydraulic valve arrangement wherein transmission line pressure is modulated to the apply chamber to achieve a desired apply pressure. However, such systems are prone to single point failures such as stuck spool valves occasioned, for example, by manufacturing debris, contamination or wear particles carried by the hydraulic fluid.

SUMMARY OF THE INVENTION

Therefore, the present invention adds robustness to single point failures of a hydraulic system used in the fill and drain of a chamber. The present system enables selective provision of pressurized fluid by a blocking valve to a trim valve which in turn controls the provision of the fluid into the chamber. Alternative exhaust paths for the fluid in the chamber are provided through the trim valve and blocking valve. Valve diagnostics are enabled by the hydraulic arrangement as is continued operation of the EVT until such failures can be rectified.

In accordance with one aspect of the present invention, a chamber is filled and exhausted by coordinated first and second valves. A first valve serves to selectively block line pressure to a second valve. The second valve selectively supplies the line pressure to the chamber. Exhausting of the chamber is effected in one of two fashions. A first exhaust path is provided wherein the chamber exhausts directly through the second valve to an exhaust destination. A second exhaust path is provided wherein the chamber exhausts back through the first valve to the exhaust destination. The two exhaust paths are preferably alternately invoked from cycle to cycle and failure of normal exhausting in a given cycle allows for diagnosis of faulty valves. The alternate paths also allow for a failsafe exhaust wherein if one of the valves fails to provide the desired exhausting of the chamber, the other of the valves can be used to exhaust the chamber. Such redundant exhaust paths thereby also provide for a robust fault tolerant circuit that allows for continued fill and exhaust subsequent to a single valve fault until such time as the hydraulic system can be serviced and the faulty valve condition rectified.

DESCRIPTION OF THE PREFERRED EMBODIMENT

Figure 1:
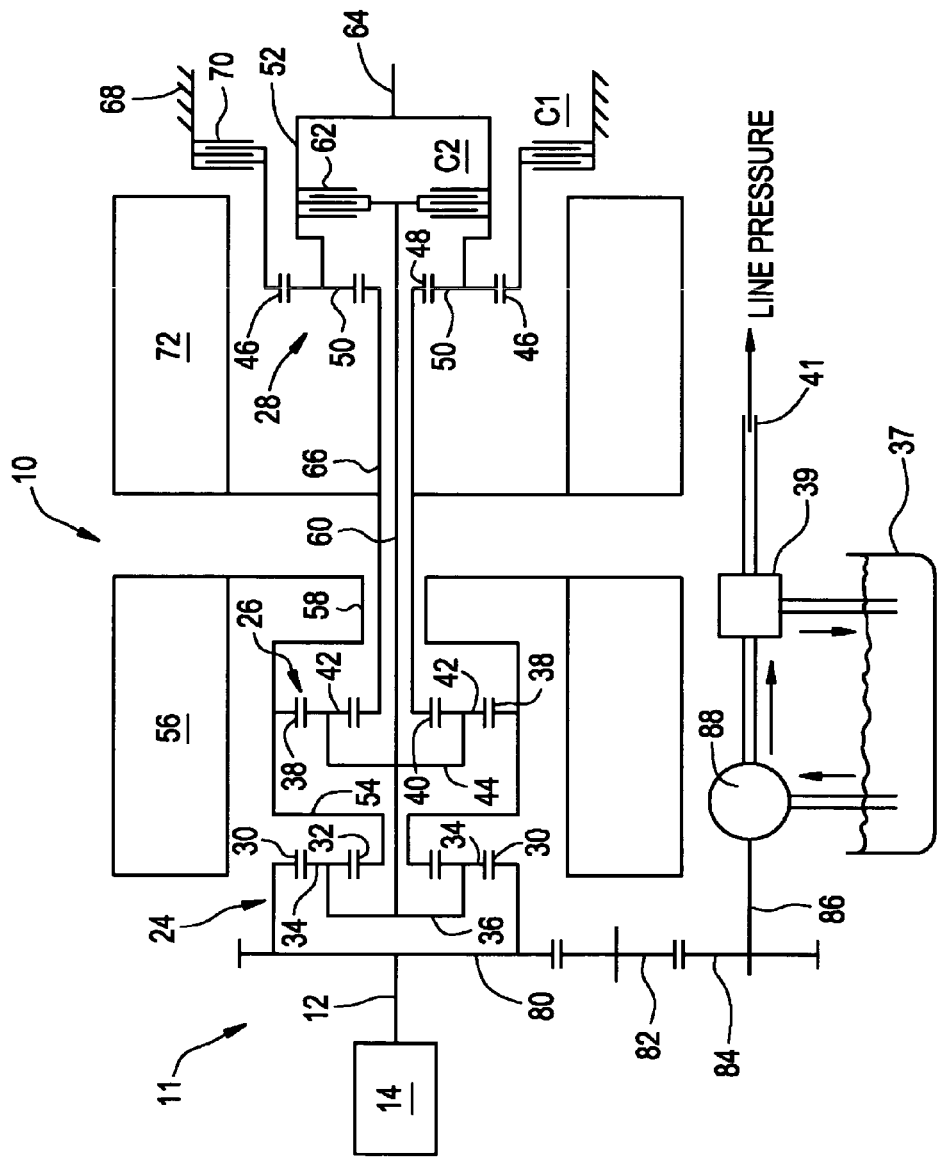
FIG. 1 is a mechanical hardware schematic representation of one preferred form of a two-mode, compound-split, electrically variable transmission particularly suited to the control of the present invention.
Figure 2:
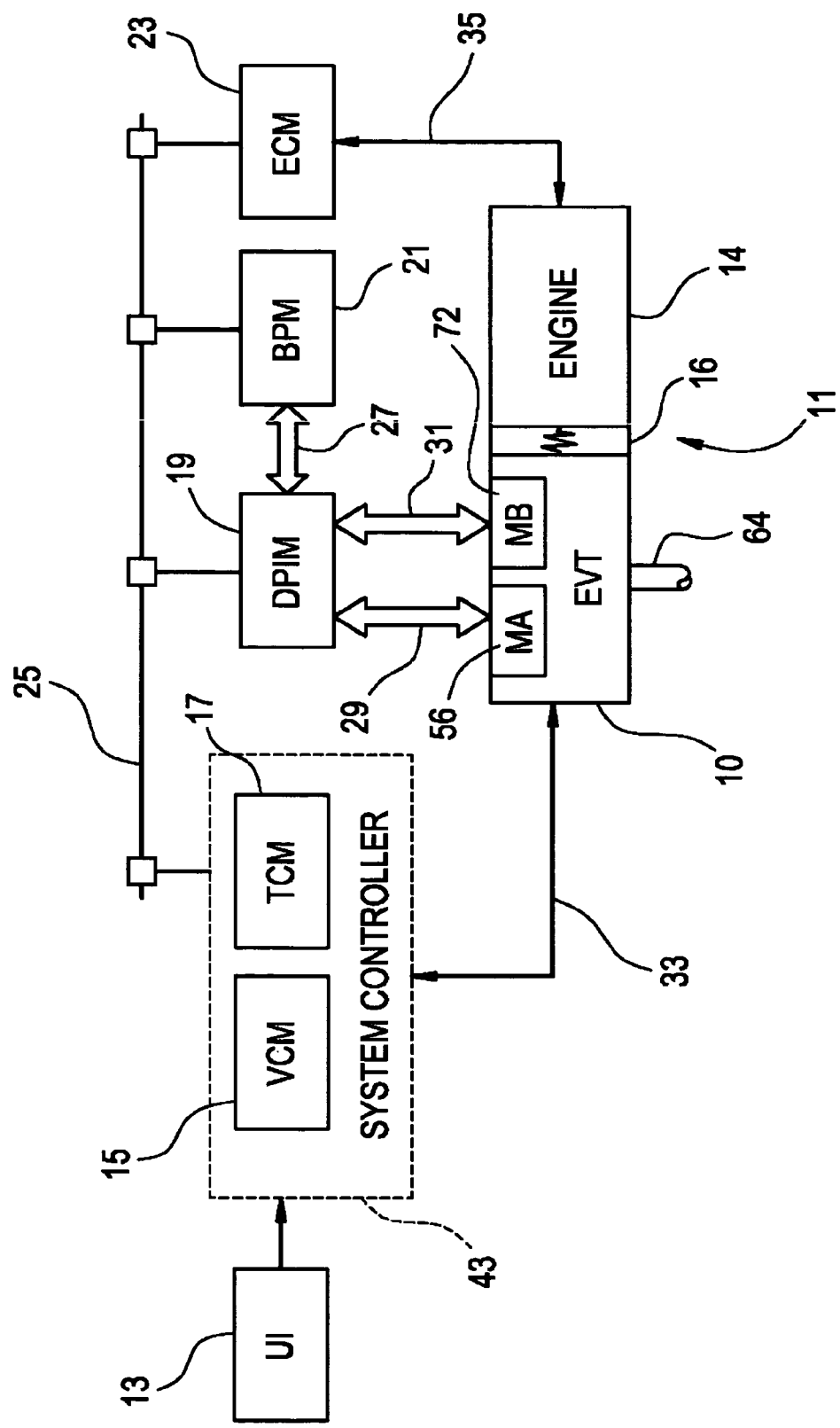
FIG. 2 is an electrical and mechanical schematic of a preferred system architecture for implementing the control of the present invention.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or MA.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein.

As should be apparent from the foregoing description the EVT 10 selectively receives power from the engine 14. As will now be explained with continued reference to FIG. 2 the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and MB speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
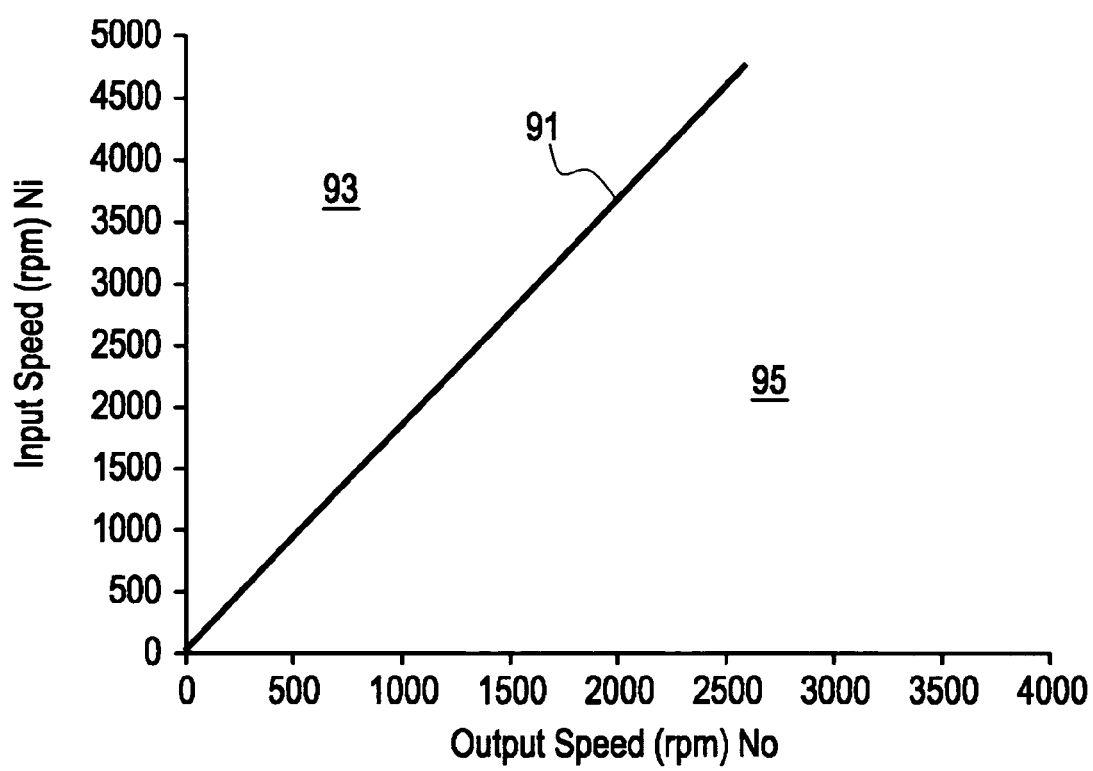
FIG. 3 is a graphical representation of various regions of operation with respect to input and output speeds of the exemplary EVT disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed-ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 95. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

In the exemplary EVT, multi-plate, wet clutches are utilized to achieve the two independent ranges, MODE 1 and MODE 2. The clutches are electronically controlled and hydraulically applied and can be applied and released independently of each other. The clutches are actuated by the provision of pressurized fluid into an apply chamber. The apply chamber pressure acts on a piston which in turn causes the engagement of the clutch. The chamber fill is controlled through the use of one "blocking" valve and one "trim" valve. The blocking valves are selectively actuated by on/off solenoids which control the flow of fluid to the top of the respective spools. The blocking valves serve to selectively supply pressurized fluid to the trim valves for each clutch in accordance with their positions. The trim valves are selectively actuated by a variable bleed solenoid, such as by PWM control, which positions the spool valves variably within the valve bodies to provide precise control of the clutch pressure during apply. For both valve types, deactivating the respective solenoid allows return springs to move the valves back into a deactivated position.

The use of both a blocking valve and trim valve for each clutch prevents undesired failure modes by requiring two independent events—blocking and trim valve actuations—to apply a clutch. The potential undesirable condition exists where the blocking valve becomes physically stuck in the valve body resulting in pressurized fluid being continuously supplied to the clutch trim circuit, a condition that would be undetected indefinitely. Under such a condition, the system is exposed to a failure of the trim solenoid which could apply the clutch without prior warning or diagnosis of the potential for such an occurrence.

Figure 4:
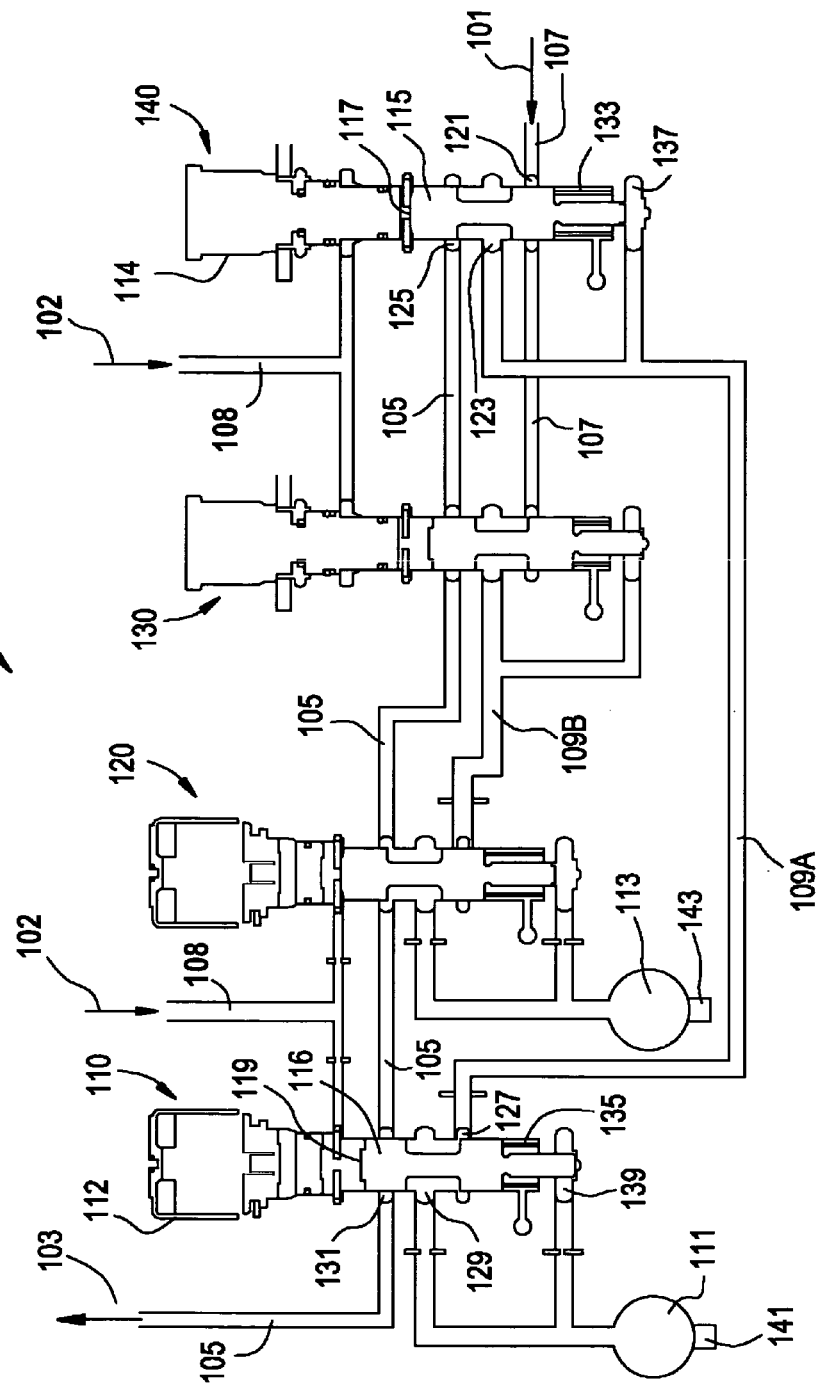
FIG. 4 is a schematic diagram of a two clutch apply and release hydraulic circuit illustrating exemplary clutch chamber exhaust paths in accordance with the present invention.

With reference now to FIG. 4, a schematic hydraulic control circuit is generally labeled with the reference numeral 100. The exemplary circuit is effective to independently control application and release of a pair of clutches, C1 and C2, as previously described. As such, two pairs of functionally identical circuits and supporting hardware are shown in the figure. A first hydraulic circuit includes a trim valve 120 and a blocking valve 130 and first clutch chamber 113. A second hydraulic circuit includes a trim valve 110 and a blocking valve 140 and second clutch chamber 111. Blocking valve 140 has a control solenoid 114 and blocking valve 130 also has a control solenoid (not separately labeled). Similarly, trim valve 110 has a control solenoid 112 and trim valve 120 also has a control solenoid (not separately labeled). Pressurized fluid, or line pressure, 101, is provided to supply line 107. Line pressure 101 is also provided to a regulator (not shown) that provides a regulated pressure 102 substantially lower than the lowest line pressure to line 108. Line 108 is coupled to trim valve 110 and blocking valve 140 at the respective solenoids for controlled application to the faces 119 and 117 of valve spools 116 and 115, respectively, to move the spools against the forces of return springs 135 and 133. Similarly, line 108 is also coupled to trim valve 120 and blocking valve 130 at the respective solenoids for controlled application of the faces of the respective valve spools (not separately labeled) to move the spools against the forces of corresponding return springs (not separately labeled). Supply line 107 is also coupled to port 121 on blocking valve 140 and to an identical port on blocking valve 130. Exhaust line 105 is coupled to port 125 on blocking valve 140 and to an identical port on blocking valve 130. Additionally, exhaust line 105 is coupled to port 131 of trim valve 110 and to an identical port on trim valve 120. Exhausted fluid 103 is ultimately returned to the oil sump 37 shown in FIG. 1. Port 123 on blocking valve 140 is coupled to port 127 on trim valve 110 via line 109A. Line 109A is also coupled to port 137 on blocking valve 140. Similarly, line 109B couples correspondingly identical ports (not separately labeled) on blocking valve 130 and trim valve 120. Clutch chamber 111 is coupled to ports 129 and 139 on trim valve 110. Similarly, clutch chamber 113 is coupled to correspondingly identical ports (not separately labeled) on trim valve 120. Pressure sensors 141 and 143 are associated with clutch chambers 111 and 113 for detecting pressure therein. Pressure sensors 141 and 143 may, for the present application related to system diagnostics, take the form of wide range sensors for detecting a continuum of pressures or pressure switches for detecting calibrated pressure thresholds. The pressure sensors are electrically connected to system controller 43 as previously described.

In FIG. 4, the valves 110 and 140 associated with control of clutch chamber 111 fluid pressure are illustrated in a positional relationship or actuation states that provide for exhaust of the chamber back through line 109A and the blocking valve 140. Preceding clutch 111 exhaust in this manner, both trim valve 110 and blocking valve 140 are in an actuated state wherein the respective spools are displaced downward against spring forces by fluid pressure provided by solenoid actuation as previously described. Pressurized fluid is thereby provided through blocking valve 140 via coupled ports 121 and 123, line 109A, and through trim valve 110 via coupled ports 127 and 129. When an exhaust of the clutch back through line 109A and blocking valve 140 is desired, the trim valve 110 remains commanded in the actuated position and the blocking valve 140 is commanded OFF or released. In a properly operational blocking valve, the spool 115 would return to the position illustrated by virtue of return spring 133 and with the assistance of fluid pressure provided at port 137. In this deactivated position, port 123 is coupled to port 125 and port 121 is decoupled from port 123. The pressurized fluid in chamber 111 is thereby exhausted through trim valve 110 via coupled ports 129 and 127, line 109A, through blocking valve 140 via coupled ports 123 and 125, and into the exhaust destination including line 105. Valves 120 and 130 associated with the control of clutch chamber 113 fluid pressure are illustrated in a positional relationship or actuation states that provide for exhaust of the chamber through only the trim valve 120. This manner of exhausting a clutch chamber is detailed with respect to the completely numbered fluid circuit associated with fill and drain of clutch chamber 111.

Figure 5:
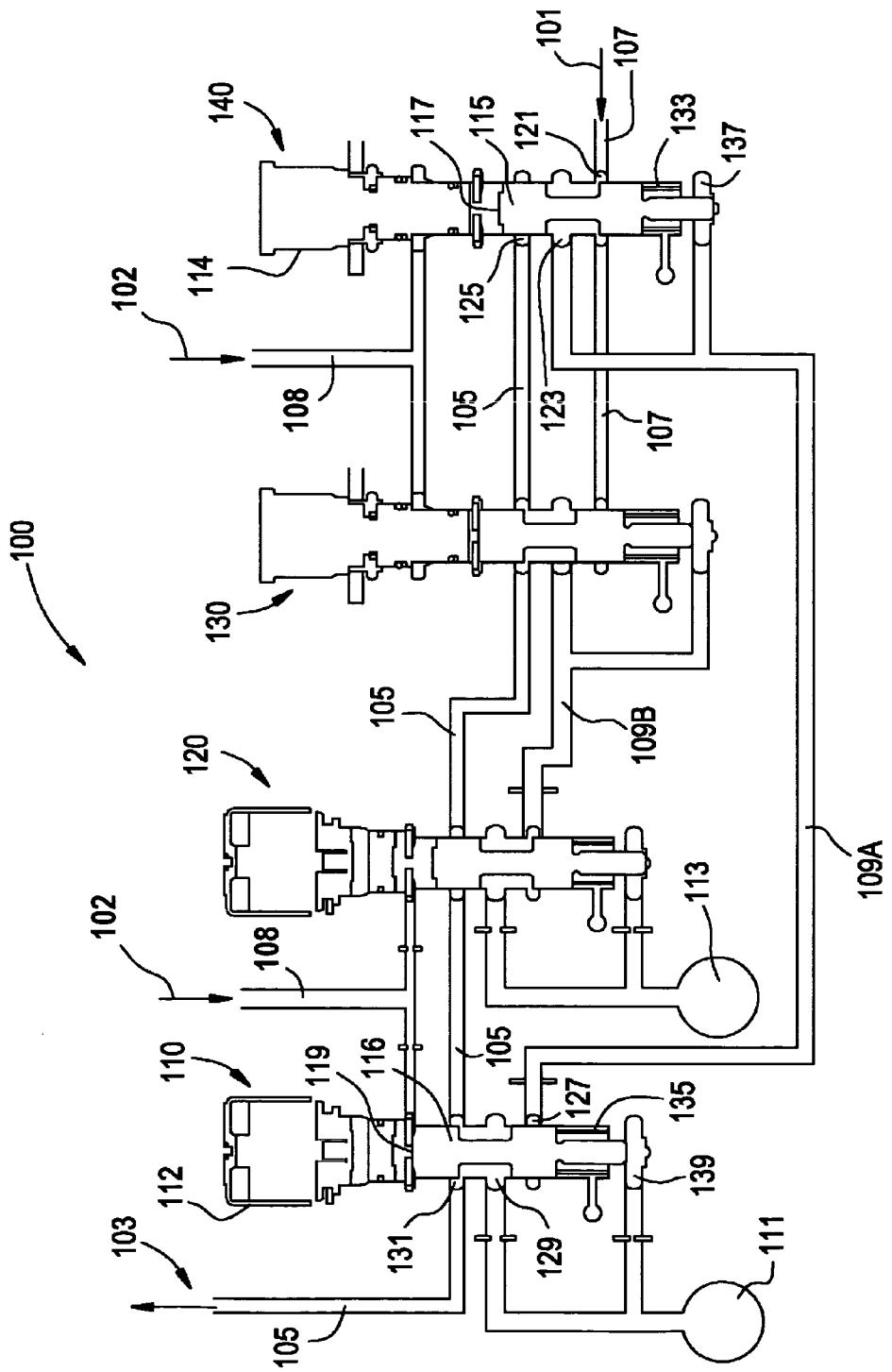
FIG. 5 is a schematic diagram of a two clutch apply and release hydraulic circuit illustrating exemplary clutch chamber exhaust paths in accordance with the present invention.

In FIG. 5, the valves 110 and 140 associated with control of clutch chamber 111 fluid pressure are illustrated in a positional relationship or actuation states that provide for exhaust of chamber 111 through only the trim valve 110. Preceding clutch 111 exhaust in this manner, both trim valve 110 and blocking valve 140 are in an actuated state wherein the respective spools are displaced downward against spring forces by fluid pressure provided by solenoid actuation as previously described. Pressurized fluid is thereby provided through blocking valve 140 via coupled ports 121 and 123, line 109A, and through trim valve 110 via coupled ports 127 and 129. When an exhaust of the clutch through valve 110 is desired, the blocking valve 140 remains commanded in the actuated position and the trim valve 110 is commanded OFF or released. In a properly operational trim valve, the spool 116 would return to the position illustrated by virtue of return spring 135 and with the assistance of fluid pressure provided at port 139. In this deactivated position, port 129 is coupled to port 131 and port 127 is decoupled from port 129. The pressurized fluid in chamber 111 is thereby exhausted through trim valve 110 via coupled ports 129 and 131, and into the exhaust destination including line 105. Valves 120 and 130 associated with the control of clutch chamber 113 fluid pressure are illustrated in a positional relationship or actuation states that provide for exhaust of the chamber through trim valve 120, line 109B, through blocking valve 130, and into the exhaust destination including line 105. This manner of exhausting a clutch chamber was detailed with respect to the completely numbered fluid circuit associated with fill and drain of clutch chamber 111.

Figure 6:
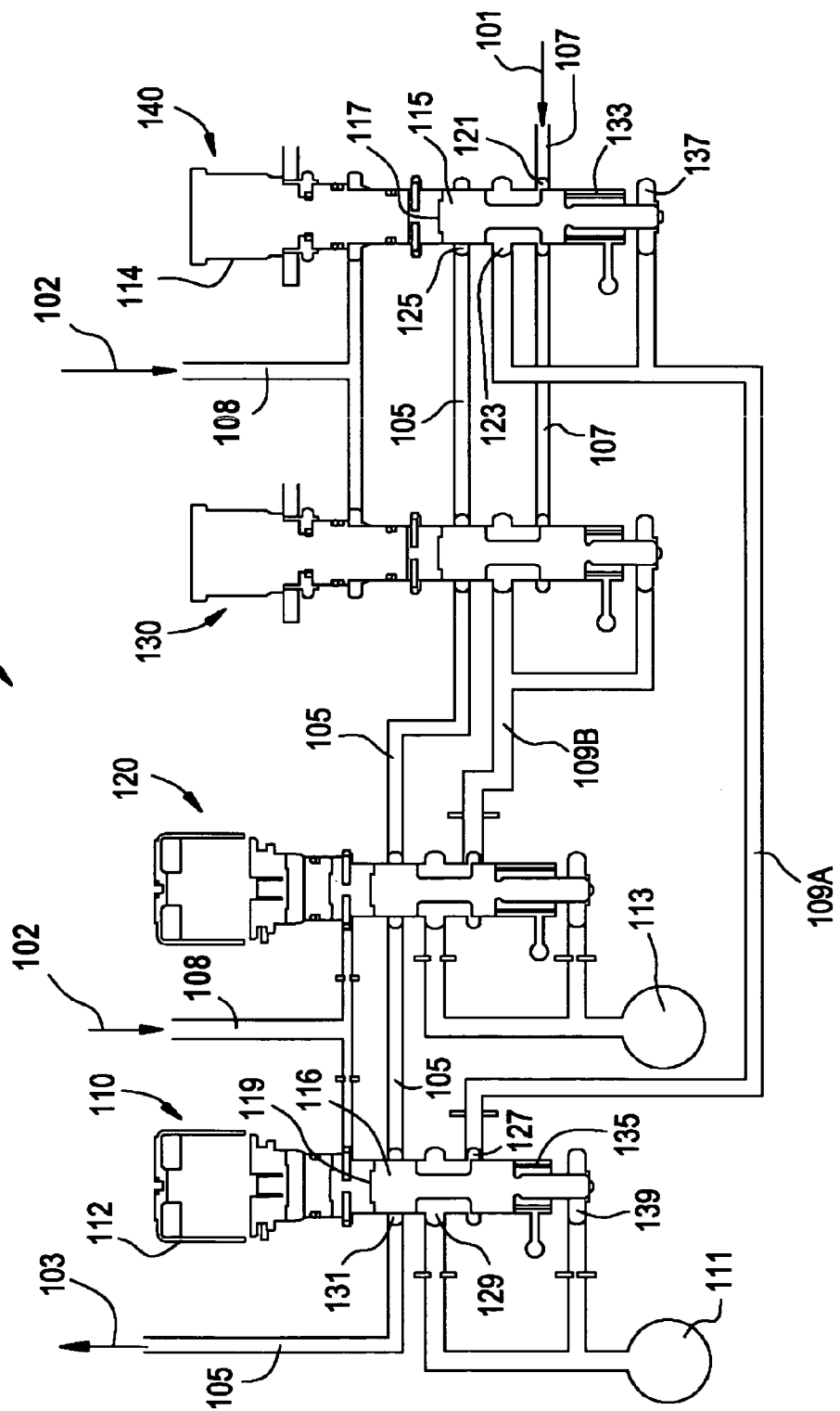
FIG. 6 is a schematic diagram of a two clutch apply and release hydraulic circuit illustrating diagnosed failure conditions of in accordance with the present invention; and, FIG. 7 is a block diagram representative of a set of steps for diagnosing failure conditions of hydraulic valves in accordance with the present invention.

With reference now to FIG. 6, all valves 110, 120, 130 and 140 are shown in a position consistent with actuation of the respective solenoids. This would be effective in providing pressurized fluid to each of the clutch chambers 111 and 113 to simultaneously engage the respective clutches or, alternatively stated, control the EVT in the fixed-ratio state. The figure is also demonstrative of failures of the release of one or both of the trim valve and the blocking valve associated with a desired off-going clutch. For example, assuming that a transition from fixed-ratio to one of MODE 1 or MODE 2 is desired and that the release of the clutch associated with clutch chamber 111 would effect such a change, the control would command the exhaust of chamber 111 by one of the two manners described. Assuming that an exhaust through only the trim valve 110 is desired, then trim valve would be deactivated and blocking valve 140 would remain activated. Failure of spool 116 to recede to its retracted position would resemble the applied position shown in the figure wherein the spool 116 remains extended either continuing to couple ports 127 and 129 and supplying pressurized fluid or partially retracted sufficient to decouple ports 127 and 129 but insufficient to couple ports 129 and 131 to effect the exhaust of the clutch chamber 111, the latter condition resulting in the dead heading of the clutch chamber 111 at the trim valve. The expected response of pressure sensor 141 during such a commanded exhaust would not be met, to wit the pressure within the clutch chamber 111 will remain excessively high consistent with the failure to exhaust same. This set of commands and conditions would indicate a failure of the trim valve 110 to properly release. In response to an indicated failure to exhaust through trim valve 110, it is desirable to command the release of the blocking valve 140 such that a backup exhaust path is established by line 109A, the coupling of ports 123 and 125 of the blocking valve 140, and line 105. The expected response of pressure sensor 141 during such a backup exhaust command would be that the pressure within clutch chamber would reach a level consistent with its exhaust. Proper exhaust through the present backup exhaust path would allow for continued operation of the fill and drain of the clutch chamber associated with the failed trim valve, perhaps at a reduced level of control precision in the application, until service of the vehicle is convenient. Failure of the clutch chamber 111 to exhaust to such backup exhaust command would indicate either a failure of the blocking valve 140 to properly release or a failure of the trim valve such that the clutch chamber is dead headed at the trim valve. Such a failure wherein exhausting of the clutch chamber cannot be effected by primary or alternative paths may require a more immediate need for vehicle service or other corrective action.

Alternatively, assuming that an exhaust through the blocking valve 140 is desired, then blocking valve 140 would be deactivated and trim valve 110 would remain activated. Failure of spool 115 to recede to its retracted position would resemble the applied position shown in the figure wherein the spool 115 remains extended either continuing to couple ports 121 and 123 and supplying pressurized fluid to line 109A or partially retracted sufficient to decouple ports 121 and 123 but insufficient to couple ports 123 and 125 to effect the exhaust of the clutch chamber 111, the latter condition resulting in the dead heading of the clutch chamber 111 at the blocking valve 140. The expected response of pressure sensor 141 during such a commanded exhaust would not be met, to wit the pressure within the clutch chamber 111 will remain excessively high consistent with the failure to exhaust same. This set of commands and conditions would indicate a failure of the blocking valve 140 to properly release. In response to an indicated failure to exhaust through blocking valve 140, it is desirable to command the release of the trim valve 110 such that a backup exhaust path is established by the coupling of ports 129 and 131 of the trim valve 110 and line 105. The expected response of pressure sensor 141 during such a backup exhaust command would be that the pressure within clutch chamber would reach a level consistent with its exhaust. Proper exhaust through the present backup exhaust path would, provided that line 109A is not dead headed at the blocking valve, allow for continued operation of the fill and drain of the clutch chamber associated with the failed blocking valve until service of the vehicle is convenient. Failure of the clutch chamber 111 to exhaust to such backup exhaust command would indicate a failure of the trim valve 110 to properly release. Such a failure wherein exhausting of the clutch chamber cannot be effected by primary or alternative paths may require a more immediate need for vehicle service or other corrective action.

While failures of either or both trim valve 110 and blocking valve 140 are used herein to illustrate aspects of the present invention, it is understood that failures of one or both of the trim valve 120 and blocking valve 130 would be identically detected and managed in accordance with the present invention. A duplicate recitation specifically with respect to valve combination 120 and 130 and associated circuitry is redundant and therefore is not set forth herein.

Figure 7:
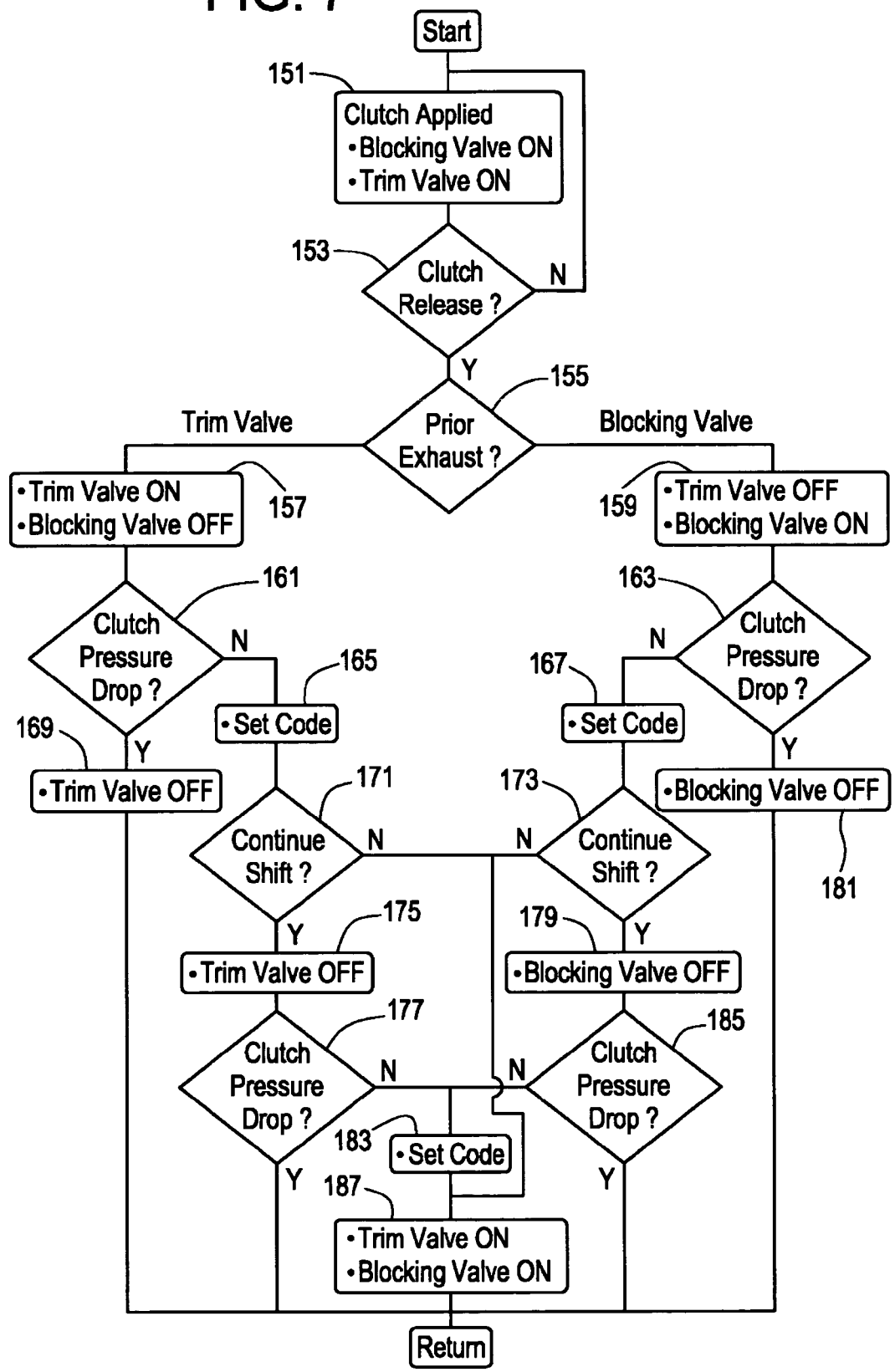

With reference to FIG. 7, an exemplary flow chart representative of steps which may be executed in the system controller for effecting various alternative exhaust strategies and diagnostic aspects of the present invention is shown. If executed by a system controller, the steps in the figure would be part of a much larger set of program instructions and other routines utilized in the overall control strategies of the EVT. Beginning at the top of the figure, the routine is entered with the subject clutch in the applied state at step 151 which represents the corresponding blocking and trim valve application. The applied valve states continue until a clutch release is commanded as shown by block 153. When a release is desired, block 155 represents a check to determine which manner of exhaust will be attempted in the present release of the subject clutch. This check is designed to alternate between the two exhaust techniques on successive release cycles. Assuming the prior release was by way of the trim valve, the present release will be accomplished by the steps directed toward the left of block 155. Similarly, if the prior release was by way of the blocking valve, the present release will be accomplished by the steps directed toward the right of block 155. Starting with the former case, block 157 commands the trim valve ON thus maintaining it in its current position and commands the blocking valve off to move it to the deactivated position. If the blocking valve assumes the commanded position, then the exhaust of the clutch chamber will occur through the blocking valve and the chamber pressure will quickly decay. A sensed pressure drop passes control to block 169 whereat the release cycle is completed by commanding the trim valve off to its deactivated position. Thereafter, the release control is exited. If the blocking valve fails to assume the commanded position, then the exhaust of the clutch chamber will not occur through the blocking valve and the chamber pressure will remain high. A sensed high pressure passes control to block 165 whereat a diagnostic flag is set indicating failure to exhaust in the commanded fashion. At this point, a decision to abort the shift may be made by block 171 as may be determined by other operational considerations. A decision to abort the shift turns control over to block 187 which commands both the trim and blocking valves on consistent with the subject clutch's continued application whereafter the release control is exited. Assuming; however, that it is desirable to continue the shift, the back-up exhaust of the clutch chamber through the trim valve is attempted at block 175 which represents the commanding of the trim valve off. A sensed pressure drop indicates the release cycle is completed successfully, albeit with a diagnosed blocking valve fault, and the release control is exited. A sensed high pressure passes control to block 183 whereat a diagnostic flag is set indicating failure to exhaust in the commanded fashion. At this point, the shift is aborted and control then passes to block 187 which commands both the trim and blocking valves on consistent with the subject clutch's continued application whereafter the release control is exited.

An exhaust desired through the trim valve as represented by the steps directed toward the right of block 155 would begin at block 159 which commands the blocking valve ON thus maintaining it in its current position and commands the trim valve off to move it to the deactivated position. If the trim valve assumes the commanded position, then the exhaust of the clutch chamber will occur through the trim valve and the chamber pressure will quickly decay. A sensed pressure drop passes control to block 181 whereat the release cycle is completed by commanding the blocking valve off to its deactivated position. Thereafter, the release control is exited. If the trim valve fails to assume the commanded position, then the exhaust of the clutch chamber will not occur through the trim valve and the chamber pressure will remain high. A sensed high pressure passes control to block 167 whereat a diagnostic flag is set indicating failure to exhaust in the commanded fashion. At this point, a decision to abort the shift may be made by block 173 as may be determined bay other operational considerations. A decision to abort the shift turns control over to block 187 which commands both the trim and blocking valves on consistent with the subject clutch's continued application whereafter the release control is exited. Assuming; however, that it is desirable to continue the shift, the back-up exhaust of the clutch chamber through the blocking valve is attempted at block 179 which represents the commanding of the blocking valve off. A sensed pressure drop indicates the release cycle is completed successfully, albeit with a diagnosed trim valve fault, and the release control is exited. A sensed high pressure passes control to block 183 whereat a diagnostic flag is set indicating failure to exhaust in the commanded fashion. At this point, the shift is aborted and control then passes to block 187 which commands both the trim and blocking valves on consistent with the subject clutch's continued application whereafter the release control is exited.

At decision blocks 171 and 173 whereat a shift abort decision is made subsequent to a diagnosed valve fault, certain self correcting actions may be taken. For example, solenoid cycling of the faulty valve could be invoked to attempt release, line pressure may be increased to effect a higher application pressure and return pressure assist at ports 139, 137 of the respective valves. Immediate self correction may result in continuance with the shift whereas unsuccessful attempts may result in consideration of other factors in arriving at a decision to abort or continue the shift by the back-up exhaust routine.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. Hydraulic control for a chamber fill and drain comprising:
    a source of pressurized fluid;
    a fluid trim valve having first, second and third ports, said first port fluidly coupled to a first fluid line, said second port fluidly coupled to a chamber, said third port fluidly coupled to a fluid exhaust line, said valve having first and second positions, said first position effective to fluidly couple said first port to said second port, said second position effective to fluidly couple said second port to said third port; and,
    a fluid blocking valve having respective first, second and third ports, said first port fluidly coupled to said pressurized fluid source, said second port fluidly coupled to said first fluid line, said third port fluidly coupled to said fluid exhaust line, said valve having first and second positions, said first position effective to fluidly couple said first port to said second port, said second position effective to fluidly couple said second port to said third port;
    wherein said chamber is supplied with pressurized fluid when the fluid trim and fluid blocking valves are both in respective first positions, said chamber is selectively exhausted of pressurized fluid through the fluid coupling of the second and third ports of the first valve when said fluid trim valve is in the respective second position and the fluid blocking valve is in the respective first position, and said chamber is selectively exhausted of pressurized fluid through the fluid coupling of the second and first ports of the fluid trim valve, the first fluid line, and the second and third ports of the fluid blocking valve when said fluid trim valve is in the respective first position and the fluid blocking valve is in the respective second position.

2. A hydraulic control as claimed in claim 1 wherein said chamber is an apply chamber of a torque transmitting device.

3. A hydraulic control as claimed in claim 1 wherein said fluid trim and fluid blocking valves are solenoid controlled spool valves.

4. A hydraulic control as claimed in claim 1 further comprising a pressure sensor for sensing chamber fluid pressure.

5. Method for controlling a fill and drain cycle of a fluid chamber comprising:
    filling said chamber by
    a) providing pressurized fluid to a fluid blocking valve,
    b) routing the pressurized fluid through the fluid blocking valve to a fluid trim valve, and
    c) routing said pressurized fluid through said fluid trim valve to the fluid chamber; and,
    draining said chamber by exhausting said fluid chamber by invoking one of
    a) a first routing for pressurized fluid from the fluid chamber through the fluid trim valve directly to an exhaust destination, and
    b) a second routing for pressurized fluid from the fluid chamber through the fluid trim valve to the fluid blocking valve, and then through the fluid blocking valve to the exhaust destination.

6. The method for controlling a fill and drain cycle of a fluid chamber as claimed in claim 5 further comprising sensing fluid pressure within said chamber and inferring therefrom valve faults.

7. The method for controlling a fill and drain cycle of a fluid chamber as claimed in claim 5 wherein draining the chamber is effected one cycle to the next by alternately invoking said first and second routings.

8. The method for controlling a fill and drain cycle of a fluid chamber as claimed in claim 7 wherein upon the failure of the chamber to drain via the invoked one of the first and second routings, invoking the other of the first and second routings.

9. Method for diagnosing valve faults in a hydraulic system, said hydraulic system including a controllable first valve and a controllable second valve, said first valve effective in a first position to fluidly couple a pressurized fluid source to a fluid passage and in a second position to fluidly decouple the pressurized fluid source from the fluid passage, said second valve effective in a first position to fluidly couple the fluid passage to a chamber and in a second position to fluidly decouple the fluid passage from the chamber, wherein said chamber is fluidly coupled to said pressurized fluid source when the first valve and second valve are simultaneously in respective first positions, comprising:
    providing an exhaust path for the fluid in the fluid passage through the first valve when the first valve is in the second position;
    providing an exhaust path for the fluid in the chamber through the second valve when the second valve is in the second position,
    subsequent to the first valve and second valve being in respective first positions, performing one of
    a) commanding the first valve to its second position and diagnosing a fault with the first valve if the fluid in the chamber fails to exhaust properly, and
    b) commanding the second valve to its second position and diagnosing a fault with the second valve if the fluid in the chamber fails to exhaust properly.

10. The method for diagnosing valve faults in a hydraulic system as claimed in claim 9 wherein failure of chamber exhaust is detected by a higher than expected pressure condition with the chamber.

11. The method for diagnosing valve faults in a hydraulic system as claimed in claim 9 further comprising, subsequent to diagnosing a valve fault in one of the first and second valves, commanding the other of the first and second valves to its second position.

12. The method for diagnosing valve faults in a hydraulic system as claimed in claim 11 further comprising diagnosing a fault in the other of the first and second valves if the fluid in the chamber fails to exhaust properly subsequent to commanding the other of the first and second valves to its second position.

* * * * *